United States Patent [19]

Onishi

[11] Patent Number: 4,914,362
[45] Date of Patent: Apr. 3, 1990

[54] ELECTRIC CIRCUIT WITH LIMIT SWITCHES FOR LIMITING ROTATABLE RANGE OF ELECTRIC DRIVE UNIT

[75] Inventor: Masayoshi Onishi, Himeji, Japan

[73] Assignee: Mitsubishi Denki Kabushiki Kaisha, Tokyo, Japan

[21] Appl. No.: 372,743

[22] Filed: Jun. 28, 1989

[30] Foreign Application Priority Data

Jun. 28, 1988 [JP] Japan ................................. 63-161851
Jun. 28, 1988 [JP] Japan ................................. 63-161852

[51] Int. Cl.⁴ ......................... H02P 3/12; B60K 31/00
[52] U.S. Cl. ..................................... 318/266; 318/261; 318/273; 318/293; 318/466
[58] Field of Search ................ 318/256, 261, 266, 269, 318/273, 293, 445, 466, 558; 123/337, 359, 360, 361, 376, 399; 251/129.01, 129.11, 129.12, 129.19

[56] References Cited

U.S. PATENT DOCUMENTS

| | | | |
|---|---|---|---|
| 2,606,312 | 8/1952 | Rogers | 318/261 |
| 2,912,632 | 11/1959 | Turtil | 318/266 X |
| 2,972,103 | 2/1961 | Cunniff | 318/293 X |
| 3,203,447 | 8/1965 | Bremner et al. | 251/129.01 X |
| 4,145,640 | 3/1979 | Kipp et al. | 318/293 X |
| 4,161,994 | 7/1979 | Collonia . | |
| 4,362,975 | 12/1982 | Orsini | 318/273 X |

Primary Examiner—Bentsu Ro
Attorney, Agent, or Firm—Sughrue, Mion, Zinn, Macpeak & Seas

[57] ABSTRACT

An electric circuit with limit-switch for limiting rotatable range of an output shaft of an electric drive unit disposed between an electric motor and a control device for supplying a drive current thereto, comprising a first snap action limit switch disposed on a first input terminal of the motor, and a second snap action limit switch disposed on a second input terminal of the motor, the limit switches having pivot points of movable contacts on a motor side, their normally-closed contacts being connected to an output side of the control device and their normally-open contacts being connected to a common connecting point, and the normally-closed contacts of the first limit switch is connected to the common connecting point through a diode in the direction allowing an electric current to flow from each of the normally-closed contacts toward the common connecting point, and further comprising a diode for allowing an electric current to flow in parallel to the second limit switch, bypassing between the normally-closed contact and the movable contact and flowing toward the motor.

2 Claims, 4 Drawing Sheets

ELECTRIC CIRCUIT WITH LIMIT SWITCHES FOR LIMITING ROTATABLE RANGE OF ELECTRIC DRIVE UNIT

BACKGROUND OF THE INVENTION

This invention relates to an electric circuit with limit-switches for limiting rotatable range of an electric drive unit for controlling the degree of opening of an automotive throttle valve.

FIGS. 1 and 2 illustrate an electric drive unit disclosed in Japanese Patent Application No. 62-203766 for example. FIG. 1 is a sectional view of the unit, and FIG. 2 is a view showing the interior of the electric drive unit shown in FIG. 1 with its protective cover removed. In these figures, 26 is a mounting plate to which the electric drive unit is mounted. 25 is a protective cover for protecting the electric drive unit. 16 is a rotary lever constituting an output portion of the electric drive unit. This is a basically circular member having a receiving groove at its periphery. 18 is an external load driving wire, one end thereof being received in the groove of the rotary lever 16 to be connected thereto and the other end thereof extending to a throttle valve (not shown). 10 is an output shaft to which the rotary lever 16 is secured. 7, 6, 5, 4, 3 constitutes a speed reducing gear train connected to the output shaft 10 through a clutch 11. 1 is a motor connected to the speed reducing gear train 7~3. This motor 1 drives the above-mentioned rotary lever 16.

Referring to FIG. 1, the other end of the output shaft 10 has connected thereto a limit lever 19. The limit lever 19 abuts against a first and a second span-action limit switches 21a and 21b (FIG. 4) at about 180° rotational position of the output shaft 10 to prevent a further rotation of the rotary lever 16. Such the electric drive unit controls the travel speed of an automobile in place of controlling of the travel speed of an automobile by pressing an accelerator pedal by an operator. That is, the motor 1 rotates in a forward or a reverse direction according to a command from a control unit (not shown). The limit switch lever 19 as well as the first and the second limit switches 21a and 21b are for limiting the above rotation range.

FIG. 3 illustrates a conventional electric circuit in which the above limit switches 21a and 21b are incorporated. In the figure, A and B are input terminals of the motor 1. "a" is an electric current in the direction rotating the motor 1 for pulling the external load driving wire 18 (in the direction opening the throttle valve), and b is an electric current opposite to the above current. D is a normally-closed contact of the first limit switch 21a, and E is a normally-open contact. G is a normally-closed contact of the second limit switch 21b and F is a normally open contact. 30A and 30B are diodes, and C is a common connection point.

The operation will now be described. The motor 1 rotates in accordance with the direction of the current flowing through the terminals A and B as long as the limit lever 19 engages none of the first and the second limit switches 21a and 21b. This is because the diodes 30A and 30B are connected in the opposite directions at the junction C, and the limit switches 21a and 21b are closed at their normally closed contacts D and G. However, when the motor 1 continues to rotate and the limit lever 19 engages the second limit switch 21b to move its movable contact from the normally-closed contact G shown in a solid line to the normally-open contact F shown in a dotted line, the circuit from the motor 1 to the terminal B is disconnected and at the same time a shorting circuit including the diode 30A allowing the current to flow into the motor 1 in the opposite direction. The motor 1 is disconnected from the driving current a and at the same time instantaneously stops due to the regeneration braking. Thereafter, the motor 1 is non-responsive to the current a from a control unit (not shown). This is because no current is supplied to the terminal B from the motor 1 through the normally-open contact F of the second limit switch 21b. However, the current b in the opposite direction flows because its depends on the nature of the conduction direction of the diode 30B. Therefore, when the current b is supplied from the control unit, the motor 1 is rotated in the direction in which the limit lever 19 moves away from the second limit switch 21b, so that the movable contact of the second limit switch 21b returns to the position shown by the solid line i.e., normally-closed contact G. Thus, the current flows from the motor 1 to the terminal B through this normally closed contact G so that the motor 1 continues to rotate.

As the motor 1 continues to rotate and the limit lever 19 engages the first limit switch 21a, the motor 1 instantaneously stops at that position as described previously, becoming non-responsive to the current b from the control unit. However, the motor 1 responses to the current a in the opposite direction.

Thus, the electric drive unit is limited as to its rotational angle independently of the control unit (not shown).

With the conventional electric circuit of the abovedescribed construction, when the limit lever 19 stops after it causes the operating levers 22a and 22b of the snap-action limit-switches 21a and 22b to be located at intermediate positions, and the movable contact of the limit switches 21a and 21b are positioned between the normally-closed contacts D and G and the normally-open contacts E and F so that they are not in contact with either of the contacts, then the electric drive unit becomes completely inoperative (in which the motor 1 does not respond to the current in either direction). For example, if the movable contact of the second limit switch 21b does not engage the normally-closed contact G as well as the normally-open contact F, no current in what ever direction flows into the motor 1. This means that, when the motor 1 is rotated by the current a so as to fully open the throttle valve, and when the movable contact of the second limit switch 21b accidentally stops at an intermediate or a neutral position between the normally-closed contact G and the normally-open contact F, then the throttle valve is held at a fully open state, resulting in a full speed runaway of the automobile under the uncontrolled state.

The probability that the phenomenon of the movable contact of the snap-action limit switch being held at a neutral position as above described takes place is extremely low. For example, the above phenomenon may take place only once in a single automobile out of 10,000 automobiles used for ten years. However, while it cannot be determined as to when, where and in which automobile the above uncontrolled runaway phenomenon occurs, a make of automobile including some in which the above phenomenon occurs are inevitably included from the stand point of statistics is a defective automobile.

On the other hand, if the movable contact of the first limit switch 21a stops at the neutral position between the normally-open contact E and the normally-closed contact D, then the electric drive unit fails to operate in the direction toward accelerating the automobile, which is also a defect although not runaway.

SUMMARY OF THE INVENTION

Accordingly, one object of the present invention is to provide an electric circuit free from the above-discussed problems.

Another object of the present invention is to provide a safe and reliable electric circuit with limit-switch for limiting rotatable range of an electric drive unit for controlling the degree of opening of an automotive throttle valve.

Another object of the present invention is to provide an electric circuit with limit-switch for limiting rotatable range of an electric drive unit for controlling the degree of opening of an automobile throttle valve which is safe and reliable and yet simple in construction.

In order to achieve the above object, according to the electric circuit of the present invention, a diode in the polarity which allows an electric current driving a motor in the throttle valve closing direction to flow therethrough is additionally provided so that the second limit switch, to which the limit lever engages when the motor of the electric drive unit is rotated and stopped at the throttle valve fully open position, is bypassed. A diode may be eliminated in order not to regeneratively brake when the motor of the electric drive unit is rotated and stopped at the throttle valve fully-open position in which the limit lever engages the first limit switch.

The diode additionally provided by the present invention is arranged such that an electric current which drives the motor in the throttle valve closing direction is allowed to flow therethrough even when the movable contact of the second limit switch to which this diode is connected in parallel is in the neutral position between the normally closed contact and the normally-open contact. On the other hand, with the embodiment in which the diode is eliminated, the regenerative braking is not achieved even when the limit lever engages the first limit switch at the fully-open position and the motor further rotates by inertia so that the first limit switch is pushed by the limit lever, eliminating the generation of the neutral state of the movable contact of this switch.

BRIEF DESCRIPTION OF THE DRAWINGS

The present invention will become more readily apparent from the following detailed description of the preferred embodiments of the present invention taken in conjunction with the accompanying drawings, in which.

DESCRIPTION OF THE PREFERRED EMBODIMENTS

Figure 1:
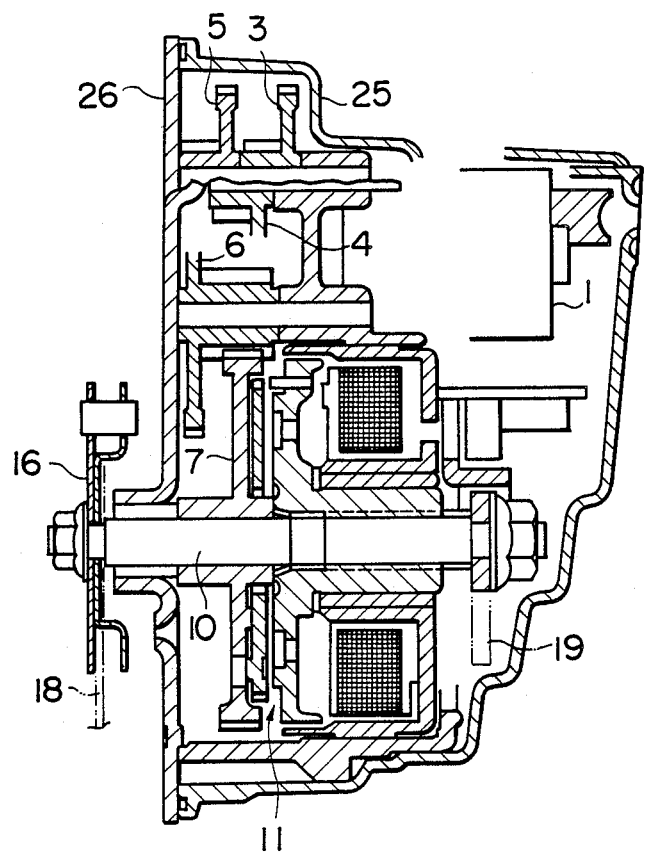
FIG. 1 is a sectional view of the electric drive unit in which such the electric circuit can be mounted.
Figure 2:
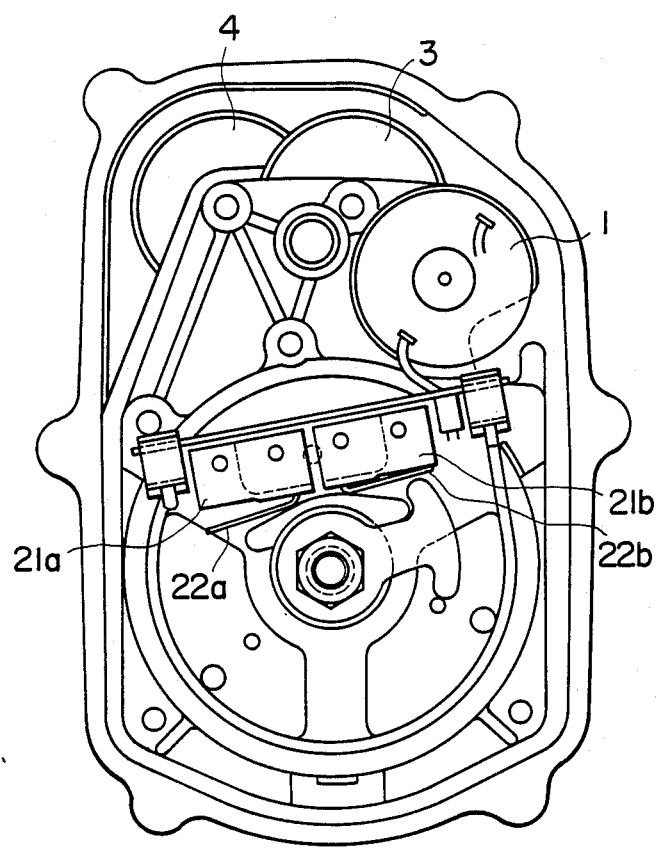
FIG. 2 is a side view of the electric drive unit shown in FIG. 1.
Figure 4:
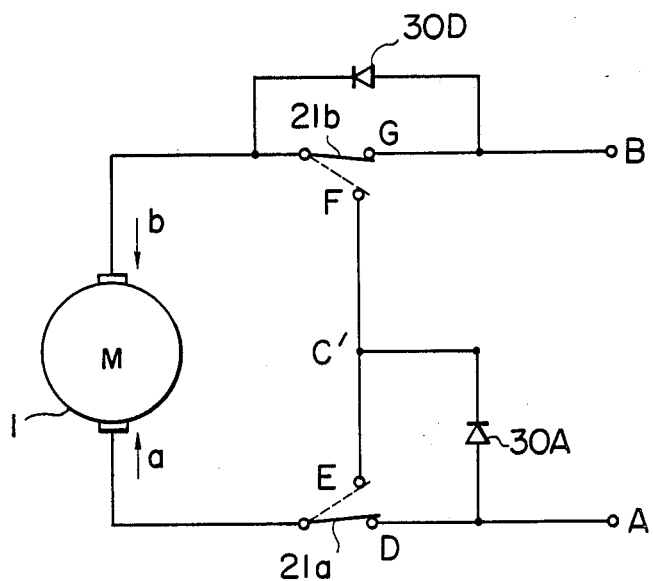
FIG. 4 is a circuit diagram showing one embodiment of the electric circuit with limit-switches according to the present invention.

FIG. 4 illustrates an electric circuit according to the present invention. In FIG. 4, 1, 21a, 21b, 30A, 30B, A, B, C, D, E, F, a and b are identical to those of the conventional design shown in FIG. 2. 30D is a diode additionally provided by the present invention, which is connected in parallel to the second limit switch 21b in the direction allowing an electric current to flow from the terminal B to the motor 1 so that the second limit switch 21b is bypassed between the motor 1 and the terminal B. The diode 30B which was provided in the conventional electric circuit is eliminated according to the present invention.

The operation of this electric circuit will now be described. However, the description of the operation which is the same as that of the conventional circuit will be omitted. It is now assumed that the motor 1 is rotated by the electric current a and stops in the throttle valve fully-open state, and that a condition occurs in which the movable contact of the second limit switch 21b is stopped at the neutral position between the normally-open position F and the normally-closed position G. After this, even when the current a is applied, the current cannot flow through the motor 1 holding it inoperative. On the other hand, when the current b is applied, this current flows into the motor 1 through the diode 30D. Thus, the motor 1 is rotated in the direction in which the limit lever 19 moves away from the second limit switch 21b. This eliminates the above-described neutral state. Therefore, the uncontrolled runaway of an automobile can be eliminated.

Even when the motor 1 is rotated by the current b and its circuit is disconnected upon the engagement of the limit lever 19 against the first limit switch when the throttle valve is fully opened, (since the circuit including the diode 30B of the conventional circuit is not provided) no regenerative braking occurs and the motor is further rotated by its inertia so that the limit lever pushes the first limit switch all the way, thereby eliminating the occurence of the neutral state of the movable contact of the first limit switch 21a.

The motor 1 is usually a pulse motor, and the currents a and b are pulse trains. Therefore, suppose that the width of these pulses is less than the operation gain from the normally-open contact to the normally-closed contact of the movable contact of the first limit switch 21a, when the current a of a pulse train is applied so as to make the throttle valve from the completely closed state to the opened state, then the movable contact of the first limit switch 21a is slightly separated from the normally-open contact E, so that the motor 1 stops without being moved by inertia before the subsequent pulse is supplied, resulting in the generation of the neutral state of the first limit switch 21a. In order to prevent this from happening, the width of each pulse of the pulse train constituting the current a is selected to correspond to be equal to or more than the previously-described operation gain of the movable contact of the first limit switch 21a.

As has been described, according to the present invention, a diode in the polarity which allows an electric current driving a motor in the throttle valve closing direction to flow therethrough is additionally provided so that the second limit switch, to which the limit lever engages when the motor of the electric drive unit is rotated and stopped at the throttle valve fully-open position, is bypassed, so that the motor rotation in the direction of closing the throttle valve has priority even when an insensitive zone operation of the unexpectable poor contact of the limit switch occurs, advantageously resulting in fail-safe system, and a circuit of the diode 30B, which forms a shorting circuit to the motor 1 through the normally-open contact E of the first limit switch to which the limit lever engages when the motor of the electric drive unit reaches its fully-closed position by its rotation in the throttle valve fully-closing direction, is eliminated, so that no regenerative braking occurs and the motor is further rotated by its inertia to cause the limit lever to firmly push the first limit switch, whereby the occurrence of the neutral state of the movable contact of the limit switch 21a is eliminated, and further since the pulse width (duration) of the drive current upon starting of the throttle valve from the fully-closed state to the open state is more than the operation gain of the movable contact of the first limit switch from the normally-open contact to the normally-closed contact, the movable contact of the first limit switch would not become the neutral state, resulting in an advantage that the occurrence of the inoperative state of the electric drive unit is completely eliminated by the electric circuit of the present invention.

Figure 3:
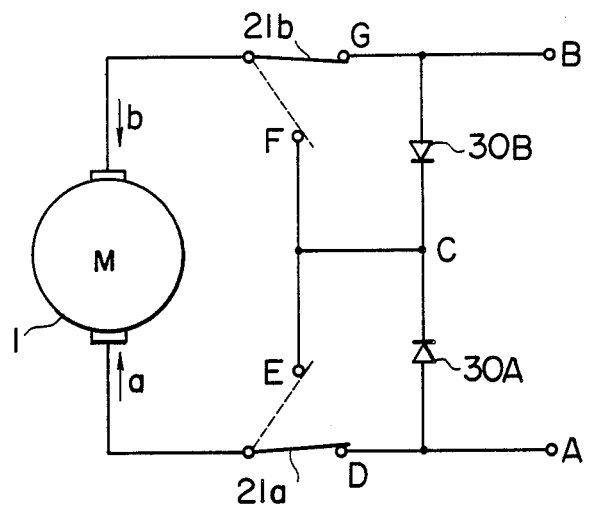
FIG. 3 is a circuit diagram showing the electric circuit of the conventional design.
Figure 5:
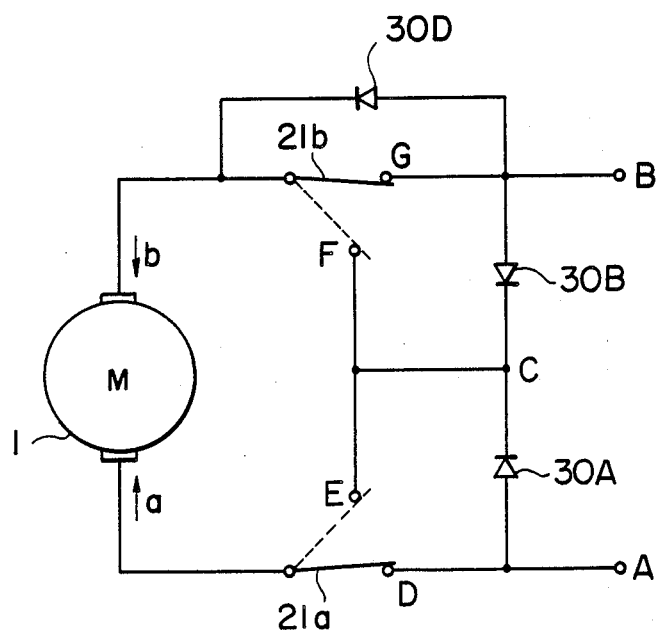
FIG. 5 is a circuit diagram showing another embodiment of the electric circuit according to the present invention.

FIG. 5 illustrates another embodiment of the present invention in which the diode 30B is not eliminated. In this embodiment, the electric circuit is different from the conventional circuit shown in FIG. 3 only in that the diode 30D similar to the diode 30D shown in FIG. 4 is additionally connected in parallel to the limit switch 21b. According to this embodiment a diode in the polarity which allows an electric current driving a motor in the throttle valve closing direction to flow therethrough is additionally provided so that the second limit switch, to which the limit lever engages when the motor of the electric drive unit is rotated and stopped at the throttle valve fully-open position, is bypassed, so that the motor rotation in the direction of closing the throttle valve has priority even when an insensitive zone operation of the unexpectable poor contact of the limit switch occurs, advantageously resulting in fail-safe system.

What is claimed is:

1. An electric circuit with limit-switch for limiting rotatable range of an output shaft of an electric drive unit disposed between an electric motor and a control device for supplying a drive current thereto, comprising;

a first snap action limit switch disposed on a first input terminal of said motor, and a second snap action limit switch disposed on a second input terminal of said motor, said limit switches having pivot points of movable contacts on a motor side, their normally-closed contacts being connected to an output side of said control device and their normally-open contacts being connected to a common connecting point, and said normally-closed contacts of said first limit switch is connected to said common connecting point through a diode in the direction allowing an electric current to flow from each of said normally-closed contacts toward said common connecting point, and further comprising a diode for allowing an electric current to flow in parallel to said second limit switch, bypassing between said normally-closed contact and said movable contact and flowing toward said motor.

2. An electric circuit with limit-switch for limiting rotatable range of an output shaft of an electric drive unit disposed between an electric motor and a control device for supplying a drive current thereto, comprising;

a first snap action limit switch disposed on a first input terminal of said motor, and a second snap action limit switch disposed on a second input terminal of said motor, said limit switches having pivot points of movable contacts on a motor side, their normally-closed contacts being connected to an output side of said control device and their normally-open contacts being connected to a common connecting point, and each of said normally-closed contacts is connected to said common connecting point through a diode in the direction allowing an electric current to flow from each of said normally-closed contacts toward said common connecting point, and further comprising a diode for allowing an electric current to flow in parallel to said second limit switch, bypassing between said normally-closed contact and said movable contact and flowing toward said motor.

* * * * *